United States Patent
Tian et al.

(10) Patent No.: US 10,608,866 B2
(45) Date of Patent: *Mar. 31, 2020

(54) FORWARDING ETHERNET PACKETS

(71) Applicant: Alibaba Group Holding Limited, George Town (KY)

(72) Inventors: Shikun Tian, Hangzhou (CN); Yingbin Wang, Hangzhou (CN); Weicai Chen, Hangzhou (CN); Bo Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,646

(22) Filed: Apr. 24, 2018

(65) Prior Publication Data

US 2018/0241608 A1    Aug. 23, 2018

Related U.S. Application Data

(63) Continuation of application No. 14/195,421, filed on Mar. 3, 2014, now Pat. No. 9,985,818.

(30) Foreign Application Priority Data

Mar. 6, 2013   (CN) .......................... 2013 1 0071261

(51) Int. Cl.
*H04L 29/12* (2006.01)
*H04L 12/743* (2013.01)

(52) U.S. Cl.
CPC .... *H04L 29/12839* (2013.01); *H04L 45/7453* (2013.01); *H04L 61/103* (2013.01); *H04L 61/2596* (2013.01); *H04L 61/6022* (2013.01)

(58) Field of Classification Search
None
See application file for complete search history.

(56) References Cited

U.S. PATENT DOCUMENTS 6,922,410 B1   7/2005   O'Connell
8,542,686 B2   9/2013   Hewson
(Continued)

FOREIGN PATENT DOCUMENTS

CN   101771732   7/2010
CN   101909003   12/2010
(Continued)

OTHER PUBLICATIONS

Miyashita et al. Section 3. What You Should Consider: Redundancy and Load Distribution. Chapter 6: Methods for Structuring Networks in a Virtualization Environment. The "Everything You Need to Know about Virtualization" Conference, 2011.

*Primary Examiner* — Saba Tsegaye
(74) *Attorney, Agent, or Firm* — Van Pelt, Yi & James LLP

(57) ABSTRACT

Forwarding Ethernet packets is disclosed, including: receiving an incoming packet; determining a value based at least in part on performing a hash operation on at least a portion of a destination Internet Protocol (IP) address included in the incoming packet; comparing the value against a pre-established look-up table to determine whether a corresponding index value is found, wherein the pre-established look-up table stores index values and corresponding data sets to respective ones of the index values; determining a destination media access control (MAC) address associated with the incoming packet based at least in part on whether the corresponding index value is found in the pre-established look-up table; and forwarding the incoming packet to a virtual machine associated with the determined destination MAC address.

22 Claims, 6 Drawing Sheets

(56) References Cited

U.S. PATENT DOCUMENTS

| | | | |
|---|---|---|---|
| 8,958,293 B1 | 2/2015 | Anderson | |
| 2003/0043825 A1 | 3/2003 | Magnussen | |
| 2007/0036161 A1 | 2/2007 | Mahamuni | |
| 2007/0047540 A1 | 3/2007 | Bragg | |
| 2007/0171908 A1* | 7/2007 | Tillman | H04L 12/66 370/389 |
| 2007/0177597 A1 | 8/2007 | Ju | |
| 2007/0288653 A1 | 12/2007 | Sargor | |
| 2008/0008192 A1 | 1/2008 | Matoba | |
| 2008/0285448 A1 | 11/2008 | Abdulla | |
| 2008/0304480 A1 | 12/2008 | Langguth | |
| 2009/0249472 A1 | 10/2009 | Litvin | |
| 2010/0208740 A1 | 8/2010 | Furutani | |
| 2011/0299537 A1 | 12/2011 | Saraiya | |
| 2012/0284712 A1 | 11/2012 | Nimmagadda | |
| 2013/0031233 A1 | 1/2013 | Feng | |
| 2013/0031294 A1 | 1/2013 | Feng | |
| 2013/0185430 A1 | 7/2013 | Giacomoni | |
| 2014/0016648 A1* | 1/2014 | Hidaka | H04L 49/15 370/400 |
| 2014/0059111 A1 | 2/2014 | Veeraiyan | |
| 2015/0372917 A1 | 12/2015 | Biswas | |

FOREIGN PATENT DOCUMENTS

| | | |
|---|---|---|
| CN | 102143067 | 8/2011 |
| JP | 2004187114 | 7/2004 |

* cited by examiner

FORWARDING ETHERNET PACKETS

CROSS REFERENCE TO OTHER APPLICATIONS

This application is a continuation of co-pending U.S. patent application Ser. No. 14/195,421, entitled FORWARDING ETHERNET PACKETS filed Mar. 3, 2014 which issued as U.S. Pat. No. 9,985,818 on May 28, 2018, and which is incorporated herein by reference for all purposes, which claims priority to People's Republic of China Patent Application No. 201310071261.8 entitled METHOD AND DEVICE FOR FORWARDING ETHERNET MESSAGES, filed Mar. 6, 2013 which is incorporated herein by reference for all purposes.

FIELD OF THE INVENTION

The present application relates to the field of computer communications. Specifically, the present application relates to techniques for forwarding Ethernet packets.

BACKGROUND OF THE INVENTION

In Ethernet technologies, each port of a core switch cascades to multiple host computers (physical machines). Moreover, the core switch generally operates in full duplex mode. That is, the core switch can simultaneously connect many pairs of ports, enabling each pair of mutually communicating physical machines to transmit data without conflict as though they were each monopolizing the communications media.

One or more number of virtual machines may be actualized on each physical machine. Each virtual machine has a pre-assigned Internet Protocol (IP) address and a pre-assigned machine access control (MAC) address. The core switch may store a MAC address table that includes data that specifies the correspondence between each port of the core switch and each MAC address associated with a virtual machine. The core switch passes communication between various virtual machines based on the stored MAC address table.

When a packet is received at the core switch from a sender (a first physical machine), the core switch uses the MAC address table to determine the port that corresponds to the destination MAC address that is included in the packet and sends the packet to the receiver (a second physical machine) that is connected to this port. When the second physical machine receives the packet, the incoming packet, from the core switch, the second physical machine forwards the incoming packet based on the destination MAC address included in the incoming packet to the virtual machine that is associated with that corresponding MAC address.

Similarly, when a physical machine receives a packet, an outgoing packet, from a virtual machine, the physical machine forwards this outgoing packet to the core switch. Then the core switch again forwards the packet to the corresponding destination physical machine according to the stored MAC address table.

However, the capacity of the core switch's MAC address table is limited. As the quantity of virtual machines increases in cloud computing environments, the limited capacities of core machine MAC address tables may no longer be able to accommodate more virtual machines.

In order to increase the use of virtual machines and without replacing hardware associated with the core switch, MAC network address translation (NAT)-based forwarding of Ethernet packets may be used. This technique assigns one common MAC address to a number of different virtual machines (which have different local MAC addresses and IP addresses). This common MAC address that is assigned to multiple different virtual machines is called a "global MAC address." Moreover, one look-up table that stores correspondences between each global MAC address and its corresponding virtual machine IP addresses and local MAC addresses is maintained on each physical machine.

When a packet (e.g., an outgoing packet), is received from a virtual machine at the physical machine on which the virtual machine is running, the physical machine uses the origin IP address in the packet as a basis for looking up in the look-up table the global MAC address that corresponds to this IP address, and the physical machine substitutes the found global MAC address for the origin MAC address in the packet. The physical machine then forwards the packet to the core switch. Similarly, when a packet (e.g., an incoming packet), is received at a physical machine from the core switch, the physical machine uses the destination IP address in the packet as a basis for looking up in the look-up table the local MAC address corresponding to this IP address. For example, the physical machine may compare the destination IP address in the packet to the IP address associated with each virtual machine in the look-up table until a matching IP address is found. Then the physical machine must determine a local MAC address and a global MAC address that correspond to the matching IP address. Next, the physical machine substitutes the local MAC address corresponding to the matching IP address for the destination MAC address in the packet and forwards it to the virtual machine associated with this local MAC address. Because the MAC address table stored by the core switch needs only to record global MAC addresses and because one global MAC address can correspond to the local MAC addresses of multiple virtual machines, this technique reduces the amount of data needed to be stored in the MAC address table maintained by the core switch and therefore, more virtual machines may be supported.

However, although the use of the MAC network address translation technique can reduce the size of MAC address tables stored by core switches, the MAC network address translation technique is relatively slow and is inefficient at forwarding Ethernet packets.

BRIEF DESCRIPTION OF THE DRAWINGS

Various embodiments of the invention are disclosed in the following detailed description and the accompanying drawings.

DETAILED DESCRIPTION

Figure 1:
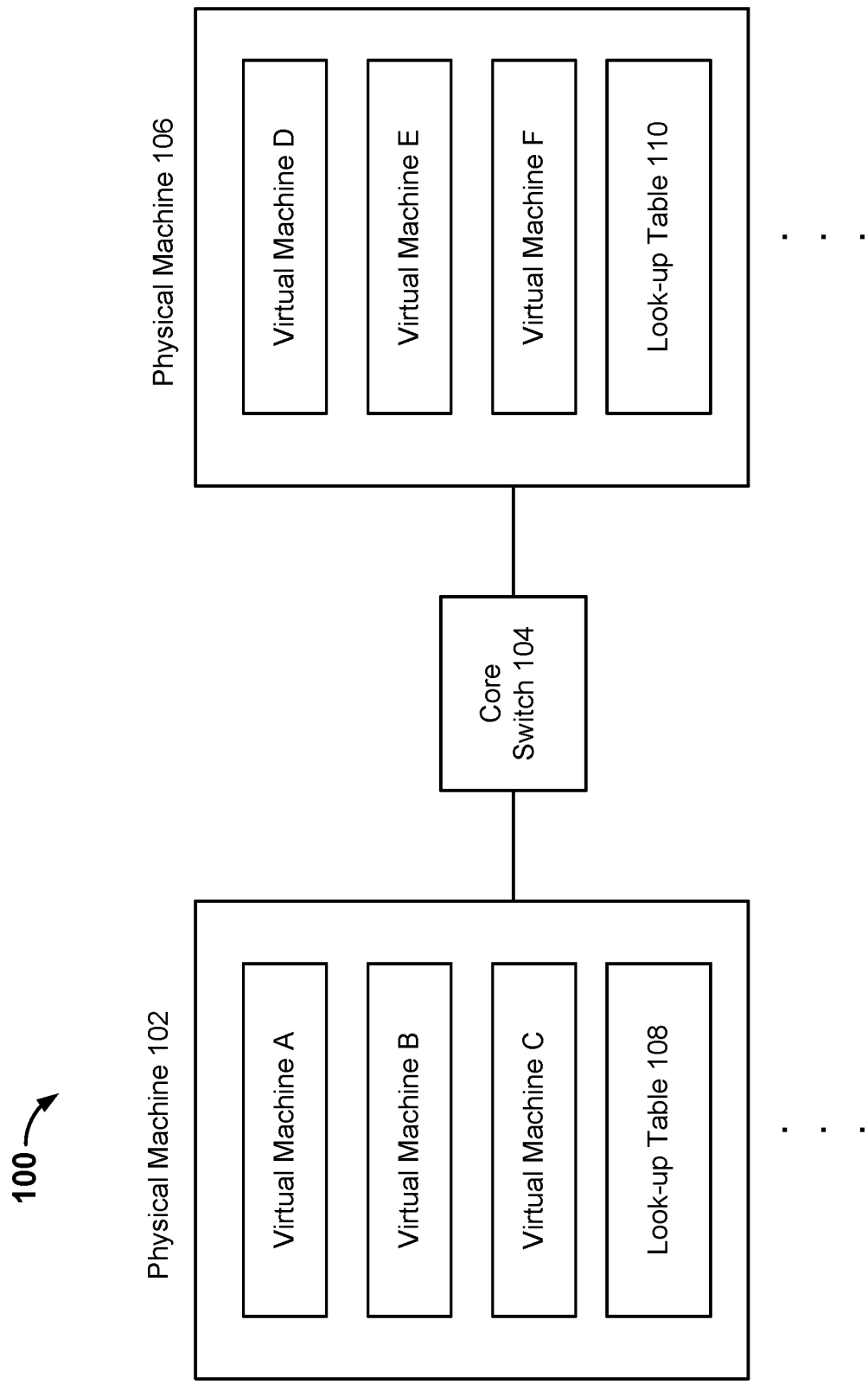
FIG. 1 is a diagram showing an embodiment of a system for forwarding Ethernet packets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of forwarding an Ethernet packet are described herein. As used herein, an "incoming packet" refers to one or more Ethernet packets received by a physical machine from a core switch and to be forwarded by the physical machine to an appropriate virtual machine running on the physical machine. As used herein, an "outgoing packet" refers to one or more Ethernet packets received by a physical machine from an entity (e.g., a virtual machine) running on the physical machine and to be forwarded by the physical machine to the core switch. An incoming packet received at a physical machine is forwarded by the physical machine to an appropriate virtual machine running on the physical machine using a pre-established look-up table stored by the physical machine. In various embodiments, a pre-established look-up table includes various index values (e.g., numerical values) and one or more data sets corresponding to each index value. Each data set includes data associated with a particular virtual machine running on the physical machine. For example, a data set can include an IP address, a local MAC address, and a global MAC address corresponding to a virtual machine. In some embodiments, a local MAC address is unique to a virtual machine (that is, each virtual machine running on a physical machine has a distinct local MAC address) but a global MAC address is common to one or more virtual machines.

For an incoming packet, a value is determined based at least in part on performing a hash operation on the Ethernet destination IP address. A corresponding index value from the pre-established look-up table is determined for the value. The corresponding index value may correspond to a group of one or more data sets and because each data set is associated with a virtual machine, the corresponding index value may correspond to a relevant group of virtual machines. From this group of one or more data sets, a matching data set (and therefore, an associated virtual machine) that includes an IP address that matches the Ethernet destination IP address included in the incoming packet is determined. The Ethernet destination MAC address included in the incoming packet is compared to the global MAC address included in the matching data set. In the event that the destination MAC address of the incoming packet matches the global MAC address of the matching data set, the value of the original Ethernet destination MAC address of the incoming packet is replaced with the value of the local MAC address of the matching data set. The physical machine then forwards the incoming packet to the virtual machine associated with the local MAC address included in the header of the incoming packet. Therefore, the pre-established look-up table can be used to quickly identify a relevant group of one or more virtual machines for an incoming packet based on a corresponding index value and then the virtual machine of the group to which to forward the incoming packet can be identified based on matching the destination IP address included in the incoming packet to the IP address associated with each data set of the group. Using the pre-established look-up table is a more efficient technique by which to determine an appropriate virtual machine to which to forward the incoming packet than the conventional technique of comparing the destination IP address included in the incoming packet to the IP address associated with each virtual machine running on the physical machine.

FIG. 1 is a diagram showing an embodiment of a system for forwarding Ethernet packets. In the example, system 100 includes physical machine 102, core switch 104, and physical machine 106. In the example, virtual machines A, B, and C are running on physical machine 102 and virtual machines D, E, and F are running on physical machine 106. A pre-established look-up table, look-up table 108, is stored on physical machine 102 and another pre-established look-up table, look-up table 110, is stored on physical machine 106. Look-up table 108 stores index values and one or more data sets corresponding to each index value. Each data set stored in look-up table 108 is associated with a virtual machine running on physical machine 102 and includes at least an IP address, a local MAC address, and a global MAC address associated with that virtual machine. Look-up table 110 stores index values and one or more data sets corresponding to each index value. Each data set stored in look-up table 110 is associated with a virtual machine running on physical machine 106 and includes at least an IP address, a local MAC address, and a global MAC address associated with that virtual machine. One or more data sets (and therefore, one or more corresponding virtual machines) may correspond to a single index value in either look-up table 108 or look-up table 110.

A virtual machine or another entity running on physical machine 102 can send an Ethernet packet to a virtual machine running on physical machine 106 via core switch 104. For example, physical machine 102 may determine an appropriate Ethernet origin MAC address for the outgoing packet based at least in part on look-up table 108. For example, an outgoing packet from a virtual machine running on physical machine 102 is forwarded to core switch 104 and core switch 104 uses a stored MAC address table to determine the port that corresponds to the destination MAC address that is included in the packet and sends the packet to the recipient physical machine, physical machine 106, that is connected to this port. As will be described in detail below, when physical machine 106 receives the packet as an incoming packet from core switch 104, physical machine 106 uses look-up table 110 to forward the incoming packet based on the destination MAC address included in the incoming packet to the appropriate virtual machine running on physical machine 106. Similarly, a virtual machine or another entity running on physical machine 106 can send an Ethernet packet to a virtual machine running on physical machine 102 via core switch 104. For example, physical machine 106 may determine an appropriate Ethernet origin MAC address for the outgoing packet based at least in part on look-up table 110. For example, an outgoing packet from a virtual machine running on physical machine 106 is forwarded to core switch 104 and core switch 104 uses a stored MAC address table to determine the port that corresponds to the destination MAC address that is included in the packet and sends the packet to the recipient physical machine, physical machine 102, that is connected to this port. As will be described in detail below, when physical machine 102 receives the packet as an incoming packet from core switch 104, physical machine 102 uses look-up table 108 to forward the incoming packet based on the destination MAC address included in the incoming packet to the appropriate virtual machine running on physical machine 102.

Figure 2:
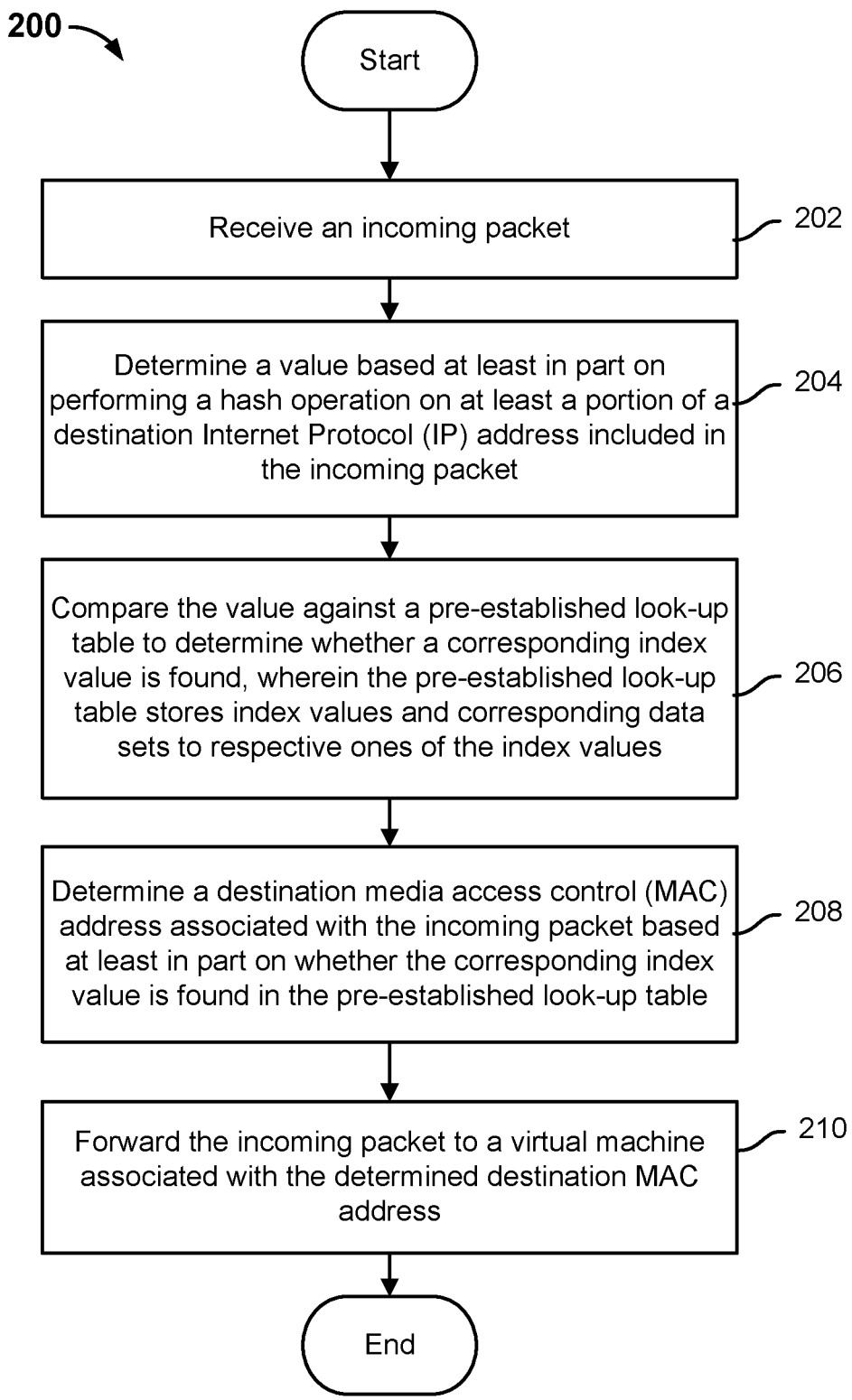
FIG. 2 is a flow diagram showing an embodiment of a process for forwarding an incoming packet to a virtual machine.

FIG. 2 is a flow diagram showing an embodiment of a process for forwarding an incoming packet to a virtual machine. In some embodiments, process 200 is implemented at system 100 of FIG. 1. Specifically, process 200 may be implemented at either physical machine 102 or physical machine 106 of system 100 of FIG. 1.

Process 200 describes an example process of a physical machine forwarding a received incoming packet to an appropriate virtual machine running on the physical machine.

At 202, an incoming packet is received. In various embodiments, the incoming packet comprises an Ethernet packet. The incoming packet may be sent by another physical machine to a core switch and sent by the core switch to the recipient physical machine.

At 204, a value is determined based at least in part on performing a hash operation on at least a portion of a destination Internet Protocol (IP) address included in the incoming packet.

Figure 5:
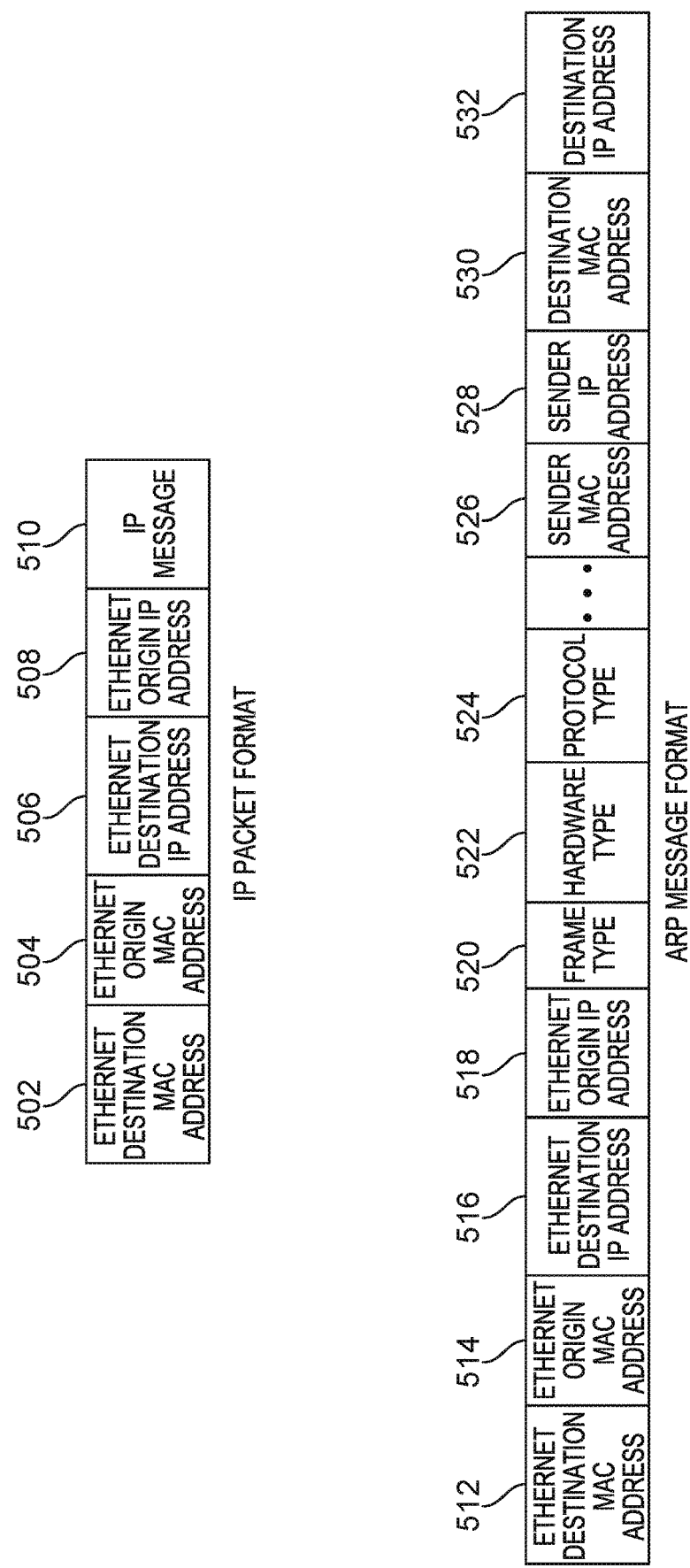
FIG. 5 shows examples of an IP packet format and an ARP message format.

In some embodiments, the incoming packet can include IP packets transmitted according to Internet Protocol (IP) (e.g., IPv4 (Internet Protocol Version 4) or IPv6 (Internet Protocol Version 6)) packets and/or ARP messages transmitted according to Address Resolution Protocol (ARP). FIG. 5 shows example formats of an IP packet and an ARP message. In various embodiments, the hash operation is performed on the Ethernet destination IP address of the incoming packet.

Returning to process 200, a hash operation maps data of an arbitrary length to values of a fixed length. These values of a fixed length that are output by the hash operation are referred to as hash values. In step 204, at least a portion of the Ethernet destination IP address that is included in the incoming packet is extracted and a hash operation is performed on the extracted data to determine a hash value. In various embodiments, the destination IP address included in the incoming packet corresponds to the IP address of the virtual machine to which the incoming packet is to be forwarded.

In some embodiments, the hash operation is performed on the entire destination IP address. In some embodiments, the hash operation that is used may be designed such that the destination IP address is mapped to a hash value that is determined based on a predetermined number of bits from the end of that IP address. For example, a destination IP address included in the incoming packet is "192.168.0.1." In this example, the hash operation includes selecting 16 bits from the end of the IP address to use as the hash value. In this case, the value associated with the 16 bits selected at the end written in binary form is "0000000000000001" and therefore a hash value of "1" may be determined from it. The hash operation described above is only one example and any hash operation may be used in practice.

At 206, the value is compared against a pre-established look-up table to determine whether a corresponding index value is found, wherein the pre-established look-up table stores index values and corresponding data sets to respective ones of the index values. In some embodiments, the hash value determined from performing a hash operation on at least a portion of the destination IP address is directly compared to the index values of the pre-established look-up table stored by the recipient physical machine. In some embodiments, the hash value determined from performing a hash operation on at least a portion of the destination IP address is further processed (e.g., squared) before being compared to the index values of the pre-established look-up table stored by the recipient physical machine.

The pre-established look-up table includes one or more index values and one or more data sets that correspond to each index value. The index values may correspond to values obtained from applying the hash operation to the destination IP addresses extracted from incoming packets. Each data set may include data associated with a particular virtual machine: an IP address, a local MAC address, and a corresponding global MAC address.

The following is an example of establishing the look-up table (e.g., prior to an implementation of process 200):

Table 1 is a table that includes a data set corresponding to each of three virtual machines A, B and C. In Table 1, the data set associated with each virtual machine includes an IP address assigned to the virtual machine, a local MAC address assigned to the virtual machine, and a global MAC address assigned to the virtual machine:

TABLE 1

| Virtual machine identifier | IP address | Local MAC address | Global MAC address |
|---|---|---|---|
| A | 192.168.0.1 | 00:16:3E:13:2B:01 | 00:16:3E:13:AA:00 |
| B | 192.168.0.2 | 00:16:3E:13:2B:03 | 00:16:3E:13:AA:00 |
| C | 192.168.0.60 | 00:16:3E:13:2B:3C | 00:16:3E:13:AA:00 |

In this example of establishing the look-up table, the respective values obtained by performing the above-described hash operation that determines a hash value based on the final 16 bits of the IP addresses for virtual machines A, B, and C are, respectively, "1," "2," and "60." The index values in the look-up table corresponding to respective virtual machines A, B, and C may be determined from these hash values. The IP addresses, local MAC addresses, and global MAC addresses of the three virtual machines correspond as data sets to the respective index values. For example, the hash value determined from the IP address of virtual machine A is "1," which can be directly used as the index value that corresponds to the data set of virtual machine A (e.g., the IP address of "192.168.0.1"; the local MAC address of "00:16:3E:13:2B:01"; and the global MAC address of "00:16:3E:13:AA:00") in the look-up table. Table 2, below, shows an example of a look-up table derived from replacing the virtual machine identifiers of Table 1 with corresponding index values:

TABLE 2

| Index value address | IP address | Local MAC address | Global MAC |
|---|---|---|---|
| 1 | 192.168.0.1 | 00:16:3E:13:2B:01 | 00:16:3E:13:AA:00 |
| 2 | 192.168.0.2 | 00:16:3E:13:2B:03 | 00:16:3E:13:AA:00 |
| 60 | 192.168.0.60 | 00:16:3E:13:2B:3C | 00:16:3E:13:AA:00 |

While the example of Table 2 shows index values that are the same as the hash values to which they correspond, in other embodiments, an index value may not be limited to the same value as a corresponding hash value but may be a value derived/calculated from the hash value. For example, an index value can be the square of the corresponding hash value. In addition, techniques for grouping the data sets (IP addresses, local MAC addresses, global MAC addresses) corresponding to virtual machines and/or index values are not limited to the hashing examples described above. Furthermore, while Table 2 shows only one data set corresponding to each index value, in some other embodiments, a group of multiple data sets (each corresponding to a different virtual machine) may correspond to an index value in the look-up table.

In some embodiments, a data set that corresponds to an index value in the look-up table may additionally comprise an allocate/cancel/query interface for allocating/canceling/querying virtual machine IP addresses, local MAC addresses, and corresponding global MAC addresses.

For example, if the allocate/cancel/query interfaces for the three virtual machines A, B and C above are, respectively, vlan.1, vlan.1, and vlan.1, the look-up table may be updated as shown in Table 3, below:

TABLE 3

| Index value | IP address | Local MAC address | Global MAC address | Allocate/cancel/query interface |
|---|---|---|---|---|
| 1 | 192.168.0.1 | 00:16:3E:13:2B:01 | 00:16:3E:13:AA:00 | vlan.1 |
| 2 | 192.168.0.2 | 00:16:3E:13:2B:03 | 00:16:3E:13:AA:00 | vlan.1 |
| 60 | 192.168.0.60 | 00:16:3E:13:2B:3C | 00:16:3E:13:AA:00 | vlan.1 |

In some embodiments, the look-up table comprises a hash table. For example, the hash table can be an array with a size of 64 KB. Each element in the array can be implemented as a linked list that is associated with a different index value. Each element in a linked list can be a (IP address, local MAC address, global MAC address) tuple associated with a particular virtual machine. In other words, each tuple comprises a data set. When a data set (tuple) associated with a virtual machine is placed in the hash table during the process of building a look-up table, the first step is to perform a hash operation (e.g., select a certain number of bits at the end) on the virtual machine IP address to obtain a hash value, i.e., an integer value from 0 through 64 k−1. Then this value serves as the subscript (i.e., index value) for the array element. The linked list corresponding to the index value is determined and this tuple is inserted into the head of the linked list. As such, the data set (tuple) associated with each virtual machine may be inserted into the linked list associated with the appropriate index value in this hash table.

Persons skilled in the art can understand that the present application is not limited to the specific implementation described above, but that index value-searchable look-up tables of data sets that include the IP addresses, local MAC addresses, and global MAC addresses of relevant virtual machines may be implemented using any appropriate technique.

As described above, in some embodiments, the index values in the look-up table are determined based on hash values corresponding to the IP addresses of various virtual machines. In some embodiments, as a result of using the hashing technique, some hash values determined for the IP addresses of different virtual machines may be the same. Therefore, in the pre-established look-up table described above, some index values may correspond to more than one data set. Each of the one or more data sets that correspond to a single index value may include an IP address, a local MAC address, and a corresponding global MAC address for a different virtual machine. In other words, depending on the hash operation that is selected, data sets corresponding to multiple virtual machines may be grouped together and associated with the same index value of the pre-established look-up table. By grouping the data set(s) associated with potentially multiple virtual machines with one index value, it is possible to quickly identify a group of virtual machines that are relevant to an incoming packet by virtue of matching a value derived from the hash value of the incoming packet's destination IP address to the index value corresponding to that group of virtual machines. As is described in further detail below, once this relevant group of one or more virtual machines is identified, it is possible to quickly determine the particular virtual machine of the identified group whose IP address matches that of the destination IP address of the incoming packet. Then the identified virtual machine's local MAC address is used for subsequent MAC network address translation processing.

By comparing the hash value (or value derived from the hash value) corresponding to the destination IP address of the received incoming packet to the index values in the pre-established look-up table, it is possible to determine whether the hash value (or the value derived thereof) corresponding to the destination IP addresses of the received incoming packets has a corresponding index value in the pre-established look-up table.

At 208, a destination media access control MAC address associated with the incoming packet is determined based at least in part on whether the corresponding index value is found in the pre-established look-up table.

Specifically, in various embodiments, if a corresponding index value can be found in the pre-established look-up table, it is determined that MAC network address translation processing is to be performed on the received incoming packet. As will be described in further detail with FIG. 4 below, MAC network address translation on an incoming packet includes determining a matching data set among potentially multiple data sets corresponding to the corresponding index value in the pre-established look-up table. The matching data set, associated with a particular virtual machine, is associated with an IP address that matches the Ethernet destination IP address included in the incoming packet. Then, it is determined whether the Ethernet destination MAC address included in the received incoming packet matches the global MAC address associated with the matching data set. In the event that the destination MAC address in the received incoming packet matches the global MAC address associated with the matching data set, the value of the local MAC address associated with the matching data set replaces the original value of the destination MAC address of the incoming packet and becomes the determined destination MAC address associated with the incoming packet. In the event that the destination MAC address in the received incoming packet does not match the global MAC address associated with the matching data set, then the original destination MAC address included in the incoming packet is the determined destination MAC address associated with the incoming packet.

At 210, the incoming packet is forwarded to a virtual machine associated with the determined destination MAC address.

In the event that MAC network address translation was performed on the incoming packet (because a hash value determined from the destination IP address of the incoming packet has a corresponding index value in the pre-established look-up table), the incoming packet is forwarded to the virtual machine associated with the local MAC address included in the translated incoming packet.

In the event that the MAC network address translation was not performed on the incoming packet (because a hash value determined from the destination IP address of the incoming packet does not have a corresponding index value in the pre-established look-up table), the incoming packet is forwarded to the virtual machine associated with the original destination MAC address that was included in the untranslated incoming packet.

As an example, assume that an incoming packet with an Ethernet destination IP address of "192.168.0.2" and an Ethernet destination MAC address of "00:16:3E:13:AA:00" is received. The value determined from at least performing the hash operation on the Ethernet destination IP address of "192.168.0.2" is "2." The determined value of "2" is compared to the example pre-established look-up table, Table 3, above. Because the determined value of "2" matches the index value of "2," the index value of "2" is the corresponding index value. In another example, if the determined value of the incoming packet does not match any index values of the pre-established look-up table, then the incoming packet may not be forwarded to any virtual machines. While in the example of Table 3, the index value of "2" corresponds to only one data set (that includes IP address "192.168.0.2," local MAC address "00:16:3E:13:2B:03," global MAC address "00:16:3E:13:AA:00," and allocate/cancel/query interface "vlan.1"), in other examples, an index value may correspond to multiple data sets. The destination IP address, "192.168.0.2," of the incoming packet is compared to the destination IP address, "192.168.0.2," of the only data set corresponding to the index value of "2." Because the destination IP address matches the destination IP address of the only data set corresponding to the index value of "2," the data set is referred to as a matching data set. Next, the destination MAC address, "00:16:3E:13:AA:00," of the incoming packet is compared to the global MAC address, "00:16:3E:13:AA:00," of the matching data set. Because the destination MAC address of the incoming packet matches the global MAC address of the matching data set, MAC network address translation is to be performed on the incoming packet. In performing MAC network address translation, the value of the destination MAC address of the incoming packet is replaced by the value of the local MAC address, "00:16:3E:13:2B:03," associated with the matching data set. Therefore, the incoming packet now includes the destination MAC address of "00:16:3E:13:2B:03," which is associated with the virtual machine (virtual machine B) to which the physical machine will forward the incoming packet. In another example, if the destination MAC address of the incoming packet does not match the global MAC address of the matching data set, MAC address translation is not performed on the incoming packet and the incoming packet is directly forwarded to a virtual machine based on the original destination MAC address that was included in the incoming packet.

Using the techniques described for process 200, it is possible to look up MAC addresses quickly and to increase MAC network address translation speed. It then becomes possible to reduce the overall size of the look-up table and to further improve Ethernet packet forwarding efficiency.

Figure 3:
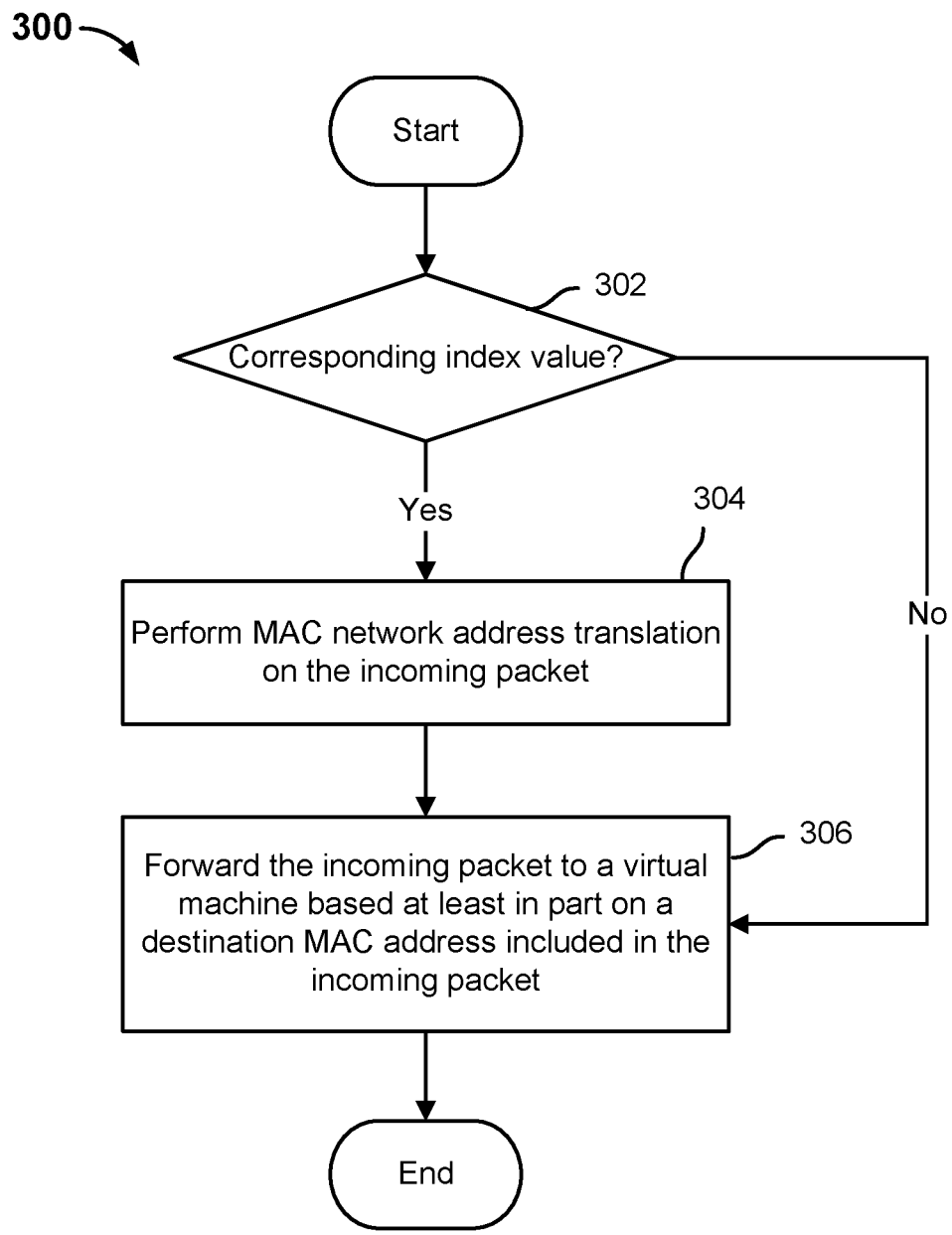
FIG. 3 is a flow diagram showing an example of a process forwarding an incoming packet to a virtual machine.

FIG. 3 is a flow diagram showing an example of a process forwarding an incoming packet to a virtual machine. In some embodiments, process 300 is implemented at system 100 of FIG. 1. Specifically, process 300 may be implemented at either physical machine 102 or physical machine 106 of system 100 of FIG. 1. In some embodiments, steps 208 and 210 of process 200 of FIG. 2 are implemented using process 300.

Process 300 assumes that a value associated with an incoming packet has already been determined. For example, the value associated with the incoming packet is determined based at least in part by performing a hash operation on the destination IP address included in the incoming packet (e.g., such as performed in step 204 of process 200 of FIG. 2.). The value associated with the incoming packet may comprise the hash value that is output by the hash operation or it may comprise a value that is a function of that hash value. For example, the value associated with the incoming packet may comprise a square or other type of function of the hash value.

At 302, a value associated with an incoming packet is compared against a pre-established look-up table to determine whether a corresponding index value can be found. The pre-established look-up table stores corresponding relationships between various index values and one or more data sets corresponding to each index value. Each data set includes data associated with a particular virtual machine running on the physical machine on which the pre-established look-up table is stored. Data associated with a particular virtual machine includes at least an IP address, a local MAC address, and a global MAC address, for example. In the event that the corresponding index value can be found in the pre-established look-up table, control is transferred to 304 and MAC network address translation is to be performed on the incoming packet. Otherwise, in the event that the corresponding index value cannot be found in the pre-established look-up table, control is transferred to 306 and MAC network address translation is not to be performed on the incoming packet.

At 304, MAC network address translation is performed on the incoming packet.

As will be described in further detail with FIG. 4 below, MAC network address translation includes determining a matching data set among potentially multiple data sets corresponding to the corresponding index value in the pre-established look-up table that is associated with an IP address that matches the Ethernet destination IP address included in the incoming packet. Then, it is determined whether the Ethernet destination MAC address in the received incoming packet matches the global MAC address associated with the matching data set. In the event that the destination MAC address in the received incoming packet matches the global MAC address associated with the matching data set, the value of the destination MAC address in the received incoming packet is replaced by the value of the local MAC address associated with the matching data set. In the event that the destination MAC address in the received incoming packet does not match the global MAC address associated with the matching data set, then the value of the destination MAC address included in the incoming packet is not changed.

At 306, the incoming packet is forwarded to a virtual machine based at least in part on a destination MAC address included in the incoming packet. The physical machine forwards the incoming packet to a virtual machine associated with the destination MAC address included in the incoming packet. In the event that MAC network address translation was performed on the incoming packet, the physical machine then forwards the incoming packet to the virtual machine associated with the translated destination MAC address (i.e., the local MAC address that was used to replace the global MAC address of the destination MAC address in the header of the incoming packet). In the event that MAC network address translation was not performed on the incoming packet, then the physical machine forwards the incoming packet to the virtual machine associated with the original, destination MAC address that was included in the untranslated incoming packet.

While process 300 describes an example of the physical machine receiving an incoming packet from a core switch and forwarding the incoming packet to a virtual machine, the physical machine can also forward an outgoing packet from a virtual machine to the core switch, which then forwards the outgoing packet to the appropriate port destination based on the destination MAC address included in the outgoing packet.

Figure 4:
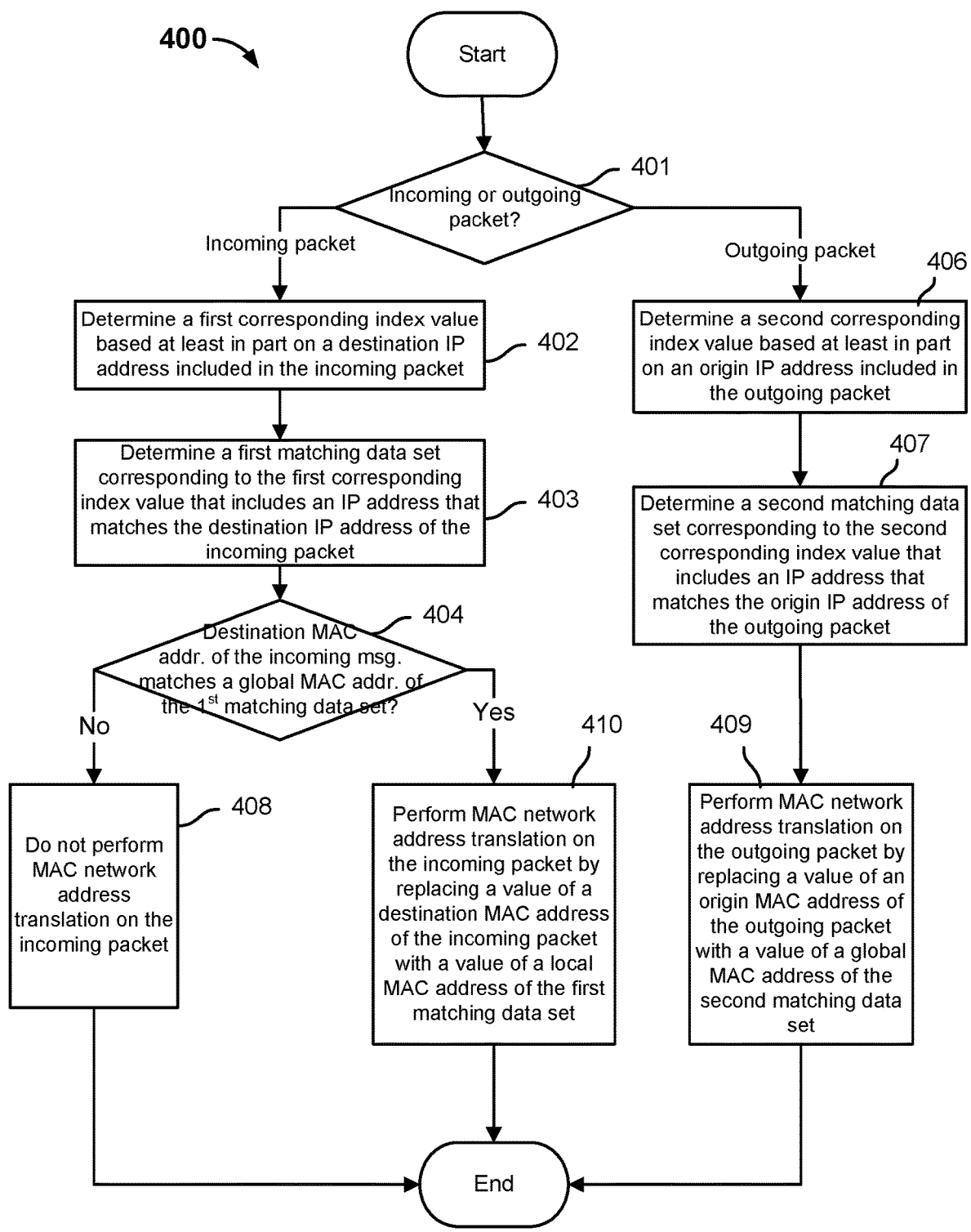
FIG. 4 is a flow diagram showing an example of performing a MAC network address translation for an incoming packet and an outgoing packet.

FIG. 4 is a flow diagram showing an example of performing a MAC network address translation for an incoming packet and an outgoing packet. In some embodiments, process 400 is implemented at system 100 of FIG. 1. Specifically, process 400 may be implemented at either physical machine 102 or physical machine 106 of system 100 of FIG. 1.

Process 400 shows an example of a process of the physical machine performing MAC network address translation on either an incoming packet received from a core switch or performing MAC network address translation on an outgoing packet to be sent to the core switch. In particular, process 400 illustrates examples of when and how MAC network address translation may be applied to an incoming packet and an outgoing packet.

At 401, it is determined whether a received packet comprises an incoming packet or an outgoing packet. In the event that the received packet is determined to be an incoming packet, control is transferred to 402. Otherwise, in the event that the received packet is determined to be an outgoing packet, control is transferred to 406. It is determined whether a received Ethernet packet comprises an incoming packet or an outgoing packet. In some embodiments, the Ethernet packet may comprise an IP packet such as an IPv4 packet or an ARP message. FIG. 5 shows an example format of an IPv4 packet and an example format of an ARP message.

Returning to FIG. 4, whether a received packet is an incoming or outgoing packet may be determined, in some embodiments, by determining whether the origin IP address included in the packet comprises an IP address that is associated with a virtual machine local to (e.g., running on) the physical machine. In the event that it is determined that the origin IP address included in the packet is a local IP address associated with the physical machine, then the received packet is determined to be an outgoing packet. Otherwise, in the event that it is determined that the origin IP address included in the packet is not a local IP address associated with the physical machine, then the received packet is determined to be an incoming packet. Whether the received packet comprises an incoming or outgoing packet may be determined by any appropriate technique and is not limited to the technique described above.

If the packet is an incoming packet, at 402, a first corresponding index value in a pre-established look-up table is determined based at least in part on a destination IP address included in the incoming packet.

A value is determined based at least in part on performing a hash operation on at least a portion of a destination IP address included in the incoming packet (e.g., step 204 of process 200 of FIG. 2). For example, referring to FIG. 5, regardless if the incoming packet is an IP packet or an ARP message, then the hash operation is performed on the Ethernet destination IP address. In some embodiments, the hash value output by the hash operation may or may not be further processed before being compared to the index values included in a pre-established look-up table. In step 402, it is assumed that a first index value corresponding to the value determined from performing the hash operation on the destination IP address of the incoming packet can be found in the pre-established look-up table. The found first corresponding index value is associated with one or more data sets in the pre-established look-up table. Each of such data sets is associated with a virtual machine running on the physical machine and includes at least an IP address, a local MAC address, and a global MAC address associated with a corresponding virtual machine.

At 403, a first matching data set corresponding to the first corresponding index value that includes an IP address that matches the destination IP address included in the incoming packet is determined.

A data set of the one or more data sets corresponding to the first corresponding index value that includes an IP address that matches the destination IP address (e.g., Ethernet destination IP address) of the incoming packet is sometimes referred to as a first matching data set. To find the first matching data set, for example, the destination IP address included in the incoming packet may be compared to the IP address of each of one or more data sets corresponding to the first corresponding index value until the first matching data set (the data set associated with an IP address that matches the destination IP address included in the incoming packet) is found.

At 404, it is determined whether the destination MAC address included in the incoming packet matches a global MAC address associated with the first matching data set. In the event that the destination IP address of the incoming packet matches the global MAC address of the first matching data set, control is transferred to 410. Otherwise, in the event that the destination IP address of the incoming packet does not match the global MAC address of the first matching data set, control is transferred to 408.

For example, referring to FIG. 5, regardless if the incoming packet is an IP packet or an ARP message, the Ethernet destination MAC address of the IP packet or ARP message is compared to a global MAC address of the first matching data set. Thus, the Ethernet destination MAC address included in the incoming packet is compared to the global MAC address included in the first matching data set to determine whether the two MAC addresses match.

At 410, MAC network address translation is performed on the incoming packet by replacing a value of a destination MAC address of the incoming packet with a value of a local MAC address associated with the first matching data set.

In some embodiments, MAC network address translation is performed by replacing the value of the destination MAC address of the incoming packet with the value of the local MAC address included in the first matching data set. As a result, the incoming packet will be forwarded by the physical machine to the virtual machine associated with that local MAC address. Put another way, the value of the destination MAC address of the incoming packet is changed from the value of the global MAC address associated with a virtual machine to the value of the local MAC address associated with the virtual machine corresponding to the first matching data set so that the physical machine can forward the incoming packet to that virtual machine.

For example, referring to FIG. 5, if the incoming packet is an IP packet, the value of the Ethernet destination MAC address in the IP packet header is replaced with the value of the local MAC address associated with the first matching data set. If the incoming packet is an ARP message, both the value of the Ethernet destination MAC address in the ARP message header and the value of the destination MAC address in the payload of the ARP message are replaced with the value of the local MAC address associated with the first matching data set.

The physical machine will ultimately forward the incoming packet to the virtual machine associated with the translated destination MAC address, which comprises the value of the local MAC address as determined by the translation process.

At 408, no matching data set is found and MAC network address translation is not performed on the incoming packet. The physical machine will ultimately forward the incoming packet to the virtual machine associated with the original, untranslated destination MAC address included in the incoming packet.

At 406, a second corresponding index value in a pre-established look-up table is determined based at least in part on an origin IP address included in the outgoing packet.

A value is determined based at least in part on performing a hash operation on at least a portion of an origin IP address included in the outgoing packet. For example, referring to FIG. 5, if the outgoing packet is an IP packet, then the hash operation is performed on the Ethernet origin IP address of the IP packet and if the outgoing packet is an ARP message, then the hash operation is performed on the Ethernet origin IP address. In some embodiments, the hash value output by the hash operation may or may not be further processed before being compared to the index values included in a pre-established look-up table. In step 406, it is assumed that a second index value corresponding to the value determined from performing the hash operation on the origin IP address of the outgoing packet can be found in the pre-established look-up table. The found second corresponding index value is associated with one or more data sets in the pre-established look-up table. Each of such data sets is associated with a virtual machine running on the physical machine and includes at least an IP address, a local MAC address, and a global MAC address associated with a corresponding virtual machine.

At 407, a second matching data set corresponding to the second corresponding index value that includes a local IP address that matches the origin IP address included in the outgoing packet is determined. To find the second matching data set, for example, the origin IP address included in the incoming packet may be compared to the IP address of each one or more data sets corresponding to the second corresponding index value until the second matching data set (the data set associated with an IP address that matches the origin IP address included in the incoming packet) is found.

A data set of the one or more data sets corresponding to the second corresponding index value that includes an IP address that matches the origin IP address (e.g., Ethernet origin IP address) of the outgoing packet is sometimes referred to as a second matching data set.

At 409, MAC network address translation is performed on the outgoing packet by replacing a value of an origin MAC address of the outgoing packet with a value of a global MAC address associated with the second matching data set.

In some embodiments, MAC network address translation is performed by replacing the value of the origin MAC address of the outgoing packet with the value of the global MAC address included in the second matching data set. As a result, the outgoing packet will be forwarded by the physical machine to the core switch and the core switch will forward the outgoing packet to the appropriate destination port (e.g., based on stored data storing corresponding relationships between global MAC addresses and ports). Put another way, the origin MAC address of the outgoing packet is changed from the value of the local MAC address associated with a virtual machine to a global MAC address associated with the virtual machine corresponding to the second matching data set so that the physical machine can forward the outgoing packet to the core switch and the core switch can forward the outgoing packet to the appropriate destination port.

For example, referring to FIG. 5, if the outgoing packet is an IP packet, the value of the Ethernet origin MAC address in the IP packet header is replaced with the value of the global MAC address in the second matching data set. If the outgoing packet is the ARP message, both the value of the Ethernet origin MAC address in the ARP message header and the value of the sender MAC address in the payload of the ARP message are replaced with the value of the global MAC address in the second matching data set.

FIG. 5 shows examples of an IP packet format and an ARP message format.

An incoming or outgoing packet may comprise an Ethernet packet. In various embodiments, an Ethernet packet may comprise an IP packet or an ARP message. As shown in FIG. 5, an example format of an IP packet includes Ethernet destination MAC address 502, Ethernet origin MAC address 504, Ethernet destination IP address 506, Ethernet origin IP address 508, and IP packet payload 510. As described with FIGS. 1-4 above, in the event that an incoming packet is an IP packet, a corresponding index value of a pre-established look-up table may be determined from at least a portion of Ethernet destination IP address 506 and that the value of Ethernet destination MAC address 502 may potentially be replaced by the value of a local MAC address associated with a data set corresponding to the corresponding index value. In the event that an outgoing packet is an IP packet, a corresponding index value of a pre-established look-up table may be determined from at least a portion of Ethernet origin IP address 508 and that the value of Ethernet origin MAC address 504 may be replaced by the value of the global MAC address associated with a data set corresponding to the corresponding index value.

As shown in FIG. 5, an example format of an ARP message includes Ethernet destination MAC address 512, Ethernet origin MAC address 514, Ethernet destination IP address 516, Ethernet origin IP address 518, frame type 520, hardware type 522, protocol type 524, sender MAC address 526, sender IP address 528, destination MAC address 530, and destination IP address 532. As described with FIGS. 1-4 above, in the event that an incoming packet is an ARP message, a corresponding index value of a pre-established look-up table may be determined from at least a portion of Ethernet destination IP address 516 and that both the value of Ethernet destination MAC address 512 (in the ARP message header) and the value of destination MAC address 530 (in the payload of the ARP message) may potentially be replaced by the value of the local MAC address associated with a data set corresponding to the corresponding index value. In the event that an outgoing packet is an ARP message, a corresponding index value of a pre-established look-up table may be determined from at least a portion of Ethernet origin IP address 518 and that the value of Ethernet origin MAC address 514 may be replaced by the value of the global MAC address associated with a data set corresponding to the corresponding index value.

Figure 6:
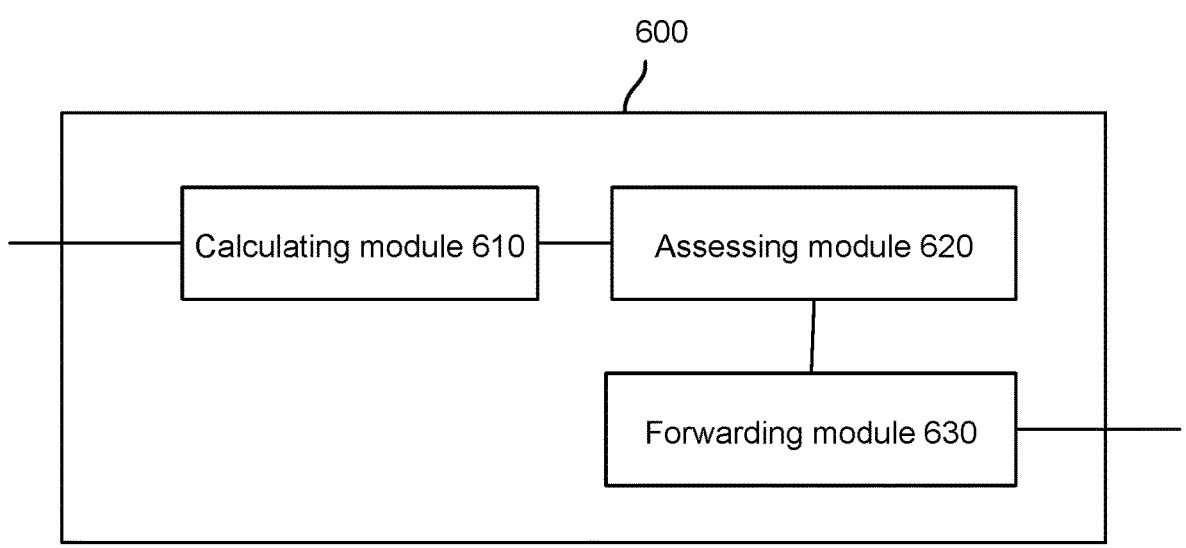
FIG. 6 is a diagram showing an embodiment of a system for forwarding Ethernet packets.

FIG. 6 is a diagram showing an embodiment of a system for forwarding Ethernet packets. In the example, system 600 includes calculating module 610, assessing module 620, and forwarding module 630.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Calculating module 610 is configured to perform a hash operation on at least a portion of an IP address included in a received Ethernet packet to obtain a hash value. Assessing module 620 is configured to use a pre-established look-up table to determine whether, based at least in part on the hash value, MAC network address translation processing needs to be performed on the received Ethernet packet. The pre-established look-up table includes one or more index values and one or more data sets corresponding to each index value. In some embodiments, the index values may correspond to values obtained from performing hash operations performed on the IP addresses associated with one or more virtual machines. For example, a data set may include data associated with a virtual machine such as an IP address, a local MAC address, and a global MAC address. Forwarding module 630 is configured to forward the received Ethernet packet based at least in part on the determination.

In some embodiments, if the hash value (or a value derived from the hash value) matches one of the index values of the pre-established look-up table, assessing module 620 may determine to perform MAC network address translation processing on the received Ethernet packet. If the hash value (or a value derived from the hash value) is not the same as any of the index values of the pre-established look-up table, assessing module 620 may determine not to perform MAC network address translation processing on the received Ethernet packet.

In some embodiments, in the event it is determined that MAC network address translation processing is to be performed on the received Ethernet packet, forwarding module 630 may forward the MAC network address translation-processed Ethernet packet after the received Ethernet packet has undergone MAC network address translation processing based on the Ethernet destination MAC address included in the Ethernet packet. In some embodiments, in the event it is determined that MAC network address translation processing is not to be performed on the received Ethernet packet, forwarding module 630 can directly forward the untranslated received Ethernet packet based on the Ethernet destination MAC address included in the Ethernet packet.

A person skilled in the art should understand that the embodiment of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-described are merely embodiments of the present application and are not used to limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
   receive an incoming packet;
   determine an index value based at least in part on performing a hash operation on at least a portion of a destination Internet Protocol (IP) address included in the incoming packet;
   determine a media access control (MAC) address to which the incoming packet is to be forwarded based at least in part on a determination of whether the index value corresponding to the performing the hash operation is included in a mapping of index values to MAC addresses, wherein:
      the mapping of index values to MAC addresses comprising fields for the index value, the destination IP address, a local MAC address, and a global MAC address; and
      to determine the MAC address to which the incoming packet is to be forwarded comprises:
         determine whether the index value is included in the mapping of index values to MAC addresses; and
         in response to a determination that the index value is included in the mapping of index values to MAC addresses, determine that the MAC address to which the incoming packet is to be forwarded corresponds to a local MAC address mapped to the index value and a MAC address included in the incoming packet; and
   forward the incoming packet to a virtual machine associated with the MAC address to which the incoming packet is to be forwarded, including to forward the incoming packet to the local MAC address based on a MAC address translation performed with respect to the incoming packet; and
one or more memories coupled to the one or more processors and configured to provide the one or more processors with instructions.

2. The system of claim 1, wherein the mapping of index values to MAC addresses is stored in a pre-established look-up table, and the determining the MAC address to which the income packet is to be forward comprises:
compare the index value against a pre-established look-up table, wherein the pre-established look-up table stores index values and corresponding data sets to respective ones of the index values.

3. The system of claim 2, wherein to determine the MAC address to which the income packet is to be forward further comprises:
determine whether the index value is included in the pre-established look-up table;
in response to determining that the value is included in the pre-established look-up table, identify a set of MAC addresses corresponding to the index value based at least in part on the comparing of the index value against the pre-established look-up table; and
determine a destination MAC address associated with the incoming packet based at least in part on whether the index value is found in the pre-established look-up table.

4. The system of claim 3, wherein to determine the destination MAC address associated with the incoming packet based at least in part on whether the index value is found in the pre-established look-up table comprises:
determine whether the index value is found in the set of MAC addresses corresponding to the index value; and
in response to determine that the index value is found in the set of MAC addresses corresponding to the index value, select the MAC address from among the set of MAC addresses corresponding to the index value and perform the MAC address translation on the incoming packet.

5. The system of claim 4, wherein in response to a determination that the index value is not found in the pre-established look-up table, the destination MAC address associated with the incoming packet is determined to comprise a value associated with a destination MAC address included in the incoming packet.

6. The system of claim 4, wherein the one or more processors are further configured to:
in response to a determination that the index value can be found in the pre-established look-up table,
determine a matching data set from the one or more data sets corresponding to the index value, wherein the matching data set includes an IP address that matches the destination IP address included in the incoming packet; and
determine whether a destination MAC address included in the incoming packet matches a global MAC address associated with the matching data set.

7. The system of claim 4, wherein in response to determining that the destination MAC address included in the incoming packet does not match the global MAC address associated with the matching data set, the destination MAC address associated with the incoming packet is determined to comprise a value associated with the destination MAC address included in the incoming packet.

8. The system of claim 1, wherein the index value determined based at least in part on performing the hash operation on the at least portion of the destination IP address included in the incoming packet comprises a hash value output by the hash operation.

9. The system of claim 1, wherein the index value determined based at least in part on performing the hash operation on the at least portion of the destination IP address included in the incoming packet comprises a function of a hash value output by the hash operation.

10. The system of claim 1, wherein the index value corresponds to one or more data sets in the pre-established look-up table.

11. The system of claim 10, wherein each of the one or more data sets includes a corresponding IP address, a local MAC address, and a global MAC address.

12. The system of claim 1, wherein the one or more processors are further configured to:
receive an outgoing packet;
determine another value based at least in part on performing another hash operation on at least a portion of an origin IP address included in the outgoing packet;
compare the other value against the pre-established look-up table to determine whether the other value can be found; and
determine an origin MAC address associated with the outgoing packet based at least in part on a data set corresponding to the other value.

13. The method of claim 1, wherein the mapping of index values to MAC addresses is comprised in a preset table that associates index values, MAC addresses, and corresponding virtual machines.

14. The method of claim 13, wherein determining a media access control (MAC) address to which the incoming packet is to be forwarded comprises performing a lookup of the MAC address in the preset table using the index value determined based at least in performing the hash operation.

15. The system of claim 4, wherein in response to determining the destination MAC address included in the incoming packet matches the global MAC address associated with the matching data set, the destination MAC address associated with the incoming packet is determined to comprise a value associated with a local MAC address associated with the matching data set.

16. A method, comprising:
receiving an incoming packet;
determining, by one or more processors, an index value based at least in part on performing a hash operation on at least a portion of a destination Internet Protocol (IP) address included in the incoming packet;
determining a media access control (MAC) address to which the incoming packet is to be forwarded based at least in part on a determination of whether the index value corresponding to the performing the hash operation is included in a mapping of index values to MAC addresses, wherein:
the mapping of index values to MAC addresses comprising fields for the index value, the destination IP address, a local MAC address, and a global MAC address; and
determining the MAC address to which the incoming packet is to be forwarded comprises:
determining whether the index value is included in the mapping of index values to MAC addresses; and
in response to determining that the index value is included in the mapping of index values to MAC addresses, determining that the MAC address to which the incoming packet is to be forwarded corresponds to a local MAC address mapped to the index value and a MAC address included in the incoming packet; and
forwarding the incoming packet to a virtual machine associated with the MAC address to which the incoming packet is to be forwarded, including forwarding the incoming packet to the local MAC address based on a MAC address translation performed with respect to the incoming packet.

17. The method of claim 16, wherein the mapping of index values to MAC addresses is stored in a pre-established look-up table, and the determining the MAC address to which the income packet is to be forward comprises:
comparing the index value against a pre-established look-up table, wherein the pre-established look-up table stores index values and corresponding data sets to respective ones of the index values.

18. The method of claim 17, wherein the determining the MAC address to which the income packet is to be forward further comprises:
determining whether the index value is included in the pre-established look-up table;
in response to a determination that the value is included in the pre-established look-up table; identifying a set of MAC addresses corresponding to the index value based at least in part on the comparing of the index value against the pre-established look-up table; and
determining a destination MAC address associated with the incoming packet based at least in part on whether the index value is found in the pre-established look-up table.

19. The method of claim 18, wherein determining the destination MAC address associated with the incoming packet based at least in part on whether the value is found in the pre-established look-up table comprises:
determining whether the index value is found in the set of MAC addresses corresponding to the index value; and
in response to a determination that the index value is found in the set of MAC addresses corresponding to the index value, selecting the MAC address from among the set of MAC addresses corresponding to the index value and perform the MAC address translation on the incoming packet.

20. The method of claim 19, wherein in response to a determination that the index value is not found in the pre-established look-up table, the destination MAC address associated with the incoming packet is determined to comprise a value associated with a destination MAC address included in the incoming packet.

21. The method of claim 19, further comprising:
determining a matching data set from the one or more data sets corresponding to the index value, wherein the matching data set includes an IP address that matches the destination IP address included in the incoming packet; and
determining whether a destination MAC address included in the incoming packet matches a global MAC address associated with the matching data set.

22. A computer program product, the computer program product being embodied in a non-transitory computer readable storage medium and comprising computer instructions for:
receiving an incoming packet;
determining an index value based at least in part on performing a hash operation on at least a portion of a destination Internet Protocol (IP) address included in the incoming packet;
determining a media access control (MAC) address to which the incoming packet is to be forwarded based at least in part on a determination of whether the index value corresponding to the performing the hash operation is included in a mapping of index values to MAC addresses, wherein:
the mapping of index values to MAC addresses comprising fields for the index value, the destination IP address, a local MAC address, and a global MAC address; and
determining the MAC address to which the incoming packet is to be forwarded comprises:
determining whether the index value is included in the mapping of index values to MAC addresses; and
in response to determining that the index value is included in the mapping of index values to MAC addresses determining that the MAC address to which the incoming packet is to be forwarded corresponds to a local MAC address mapped to the index value and a MAC address included in the incoming packet; and
forwarding the incoming packet to a virtual machine associated with the MAC address to which the incoming packet is to be forwarded, including forwarding the incoming packet to the local MAC address based on a MAC address translation performed with respect to the incoming packet.

* * * * *

UNITED STATES PATENT AND TRADEMARK OFFICE
CERTIFICATE OF CORRECTION

PATENT NO. : 10,608,866 B2
APPLICATION NO. : 15/961646
DATED : March 31, 2020
INVENTOR(S) : Shikun Tian et al.

Page 1 of 1

It is certified that error appears in the above-identified patent and that said Letters Patent is hereby corrected as shown below:

In the Claims

In Column 17, Line 29, Claim 4, delete "determine" and insert --a determination--, therefor.

Signed and Sealed this
Eighth Day of September, 2020

Andrei Iancu
*Director of the United States Patent and Trademark Office*